United States Patent [19]

Hacker

[11] Patent Number: 4,685,949
[45] Date of Patent: Aug. 11, 1987

[54] GLASS FLOWER PROCESS

[76] Inventor: Donald E. Hacker, 3200 NW. 5th Ter., Pompano Beach, Fla. 33064

[21] Appl. No.: 943,327

[22] Filed: Dec. 19, 1986

[51] Int. Cl.⁴ ............................................. C03B 23/09
[52] U.S. Cl. .......................................... 65/42; 65/46; 65/64; 65/70; 65/87; 65/105
[58] Field of Search .................. 65/42, 44, 46, 63, 64, 65/70, 87, 89, 102, 105, 112, 17

[56] References Cited

U.S. PATENT DOCUMENTS

| | | | |
|---|---|---|---|
| 703,618 | 7/1902 | Sievert | 65/63 |
| 805,943 | 11/1905 | Campbell | 65/87 X |
| 861,055 | 7/1907 | Seymour | 65/46 |
| 1,230,368 | 6/1917 | Barber | 65/46 |
| 1,372,294 | 3/1921 | Karabin et al. | 65/105 X |
| 2,551,279 | 5/1951 | Miller | 65/64 |
| 3,463,624 | 8/1969 | Labino | 65/102 X |
| 3,539,919 | 11/1970 | Hogg | 65/42 X |

Primary Examiner—Robert L. Lindsay
Attorney, Agent, or Firm—Joseph Zallen

[57] ABSTRACT

In a process for preparing glass flowers having petals, the steps of preparing petals which comprise providing a blown elongated enlarged hollow bulb on a hollow glass tube, heating and manipulating the bulb so as to separate it into two vertical dish-like pre-petal members, removing the pre-petal members from the tube, elongating the ends of the pre-petal members so as to form solid tips, attaching the members to a glass flower stem at the tips and heating and manipulating the members so as to refine the shape of the petals.

1 Claim, 8 Drawing Figures

GLASS FLOWER PROCESS

BACKGROUND OF INVENTION

This invention relates to a method for making glass flowers. In particular it relates to a method for making glass flowers which resemble real flowers more closely than prior art methods.

Although making of artistic glass objects is an old art and glass blowing a well-established skill, no commercially feasible method has been hitherto described for making glass flowers which truly resemble real flowers.

One object of the present invention is to provide a method for making glass flowers which closely resemble true flowers.

Other objects and advantages of this invention will be apparent from the description and claims which follow, taken together with the appended drawings.

SUMMARY OF INVENTION

The invention comprises broadly making petals by forming a closed-in hollow ellipsoid at the end of a glass tube, cutting the ellipsoid transversely so as to form two dish-like members, attaching solid stems to such members, and drawing out the opposite ends to form tips so that the dish-like members now resemble petals, attaching the tips to a preformed stem structure and heating the dish-like members so as to form them into the desired final petal shapes.

SPECIFIC EXAMPLE OF INVENTION

Figure 1:
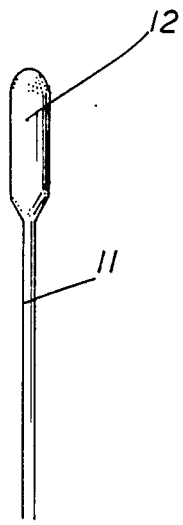
FIG. 1 shows a glass tube with a closed bulbous end.
Figure 2:
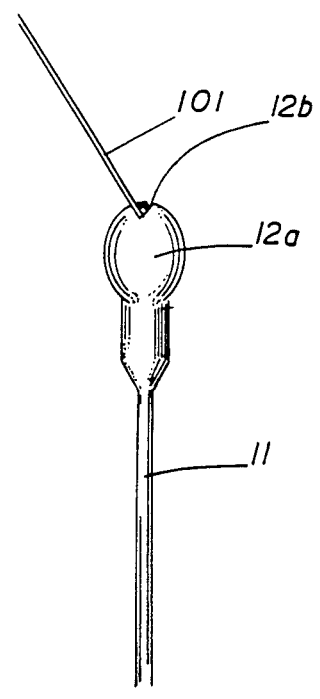
FIG. 2 illustrates the end of the bulb being further enlarged and showing it being opened up after heating with a hot thin metal wire.
Figure 3:
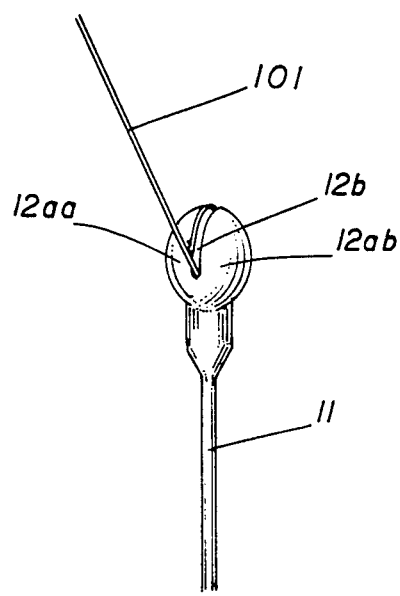
FIG. 3 shows further opening.
Figure 4:
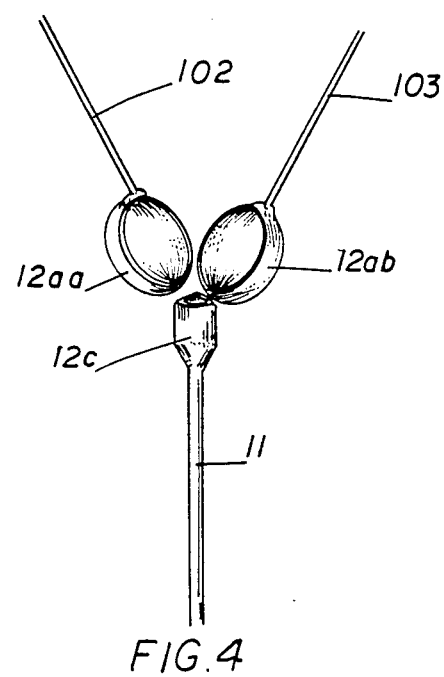
FIG. 4 shows the final result after cutting and separation.
Figure 5:
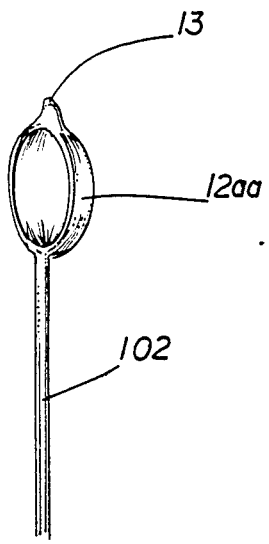
FIG. 5 shows a formation of a tip on the end of the petal former.
Figure 6:
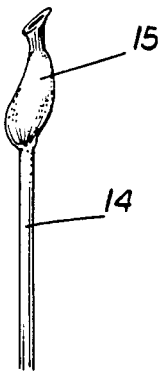
FIG. 6 shows the formation of the flower stem to which the petals and leaves are to be attached.
Figure 7:
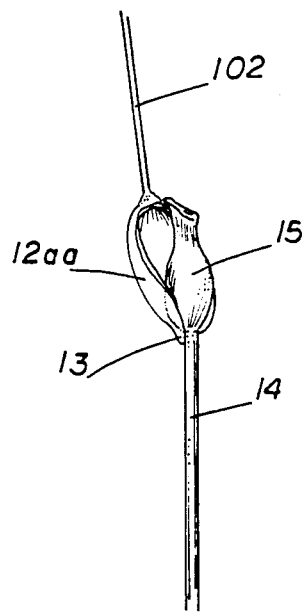
FIG. 7 shows the attachment of a petal former to the stem.
Figure 8:
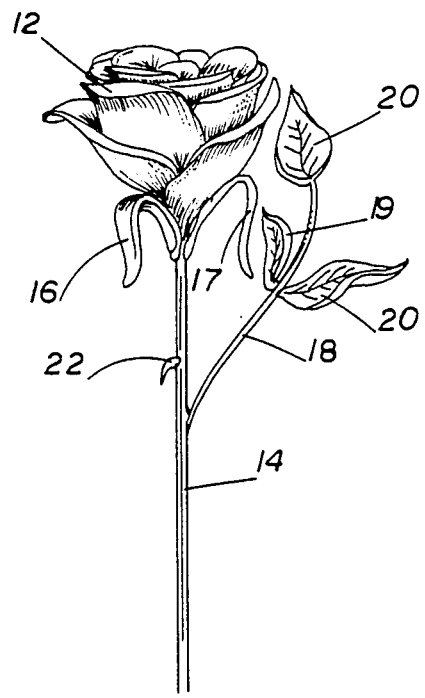
FIG. 8 shows a complete flower where a multiplicity of petals have been attached to the stem together with leaves.

Having reference to the drawings a hollow glass tube 11 is blown to form an obloid closed end 12. Blowing is continued to form an enlarged ellipsoid end 12a. A heated metal rod 101 is used to pull glass out in line and then pick excess off after being heated. This yields separation 12b in ellipsoid end 12a to provide two dish-like members 12aa and 12ab.

Solid glass rods 102 and 103 are then attached to the top portions of the dish-like members 12aa and 12ab so that they may be removed, leaving socket 12c attached to original hollow tube 11.

A tip 13 is formed at the top of members 12aa and 12bb and are inverted so as to be attached so that the tips 13 are attached to the stem 14 which had been previously prepared. Hollow flower stem 14 has an enlarged end 15 formed by heating. After the petals forming sections 12aa and 12ab and correspondingly similar sections are formed and attached to stem 14 they are then heat-softened and manipulated to form a shape more closely resembling the actual flower petal. Various other additional portions 16,17,18,19,20 and 22 are separately formed and attached to stem 14.

I claim:

1. In a process for preparing glass flowers having petals, the steps of preparing a petal comprising: providing a blown elongated enlarged hollow bulb on a hollow glass tube, heating and manipulating the bulb so as to separate it into two elongated dish-like pre-petal members, removing a said pre-petal member from the tube, elongating the end of said pre-petal member so as to form a solid tip, attaching said member to a glass flower stem at said tip and heating and manipulating said member so as to refine the shape of the petal.

* * * * *